A. WINTON.
MECHANISM FOR CONTROLLING THE POSITION OF THE DIRECTION LEVER OF A MOTOR DRIVEN VESSEL.
APPLICATION FILED SEPT. 30, 1911.
1,046,529.
Patented Dec. 10, 1912.
2 SHEETS—SHEET 1.
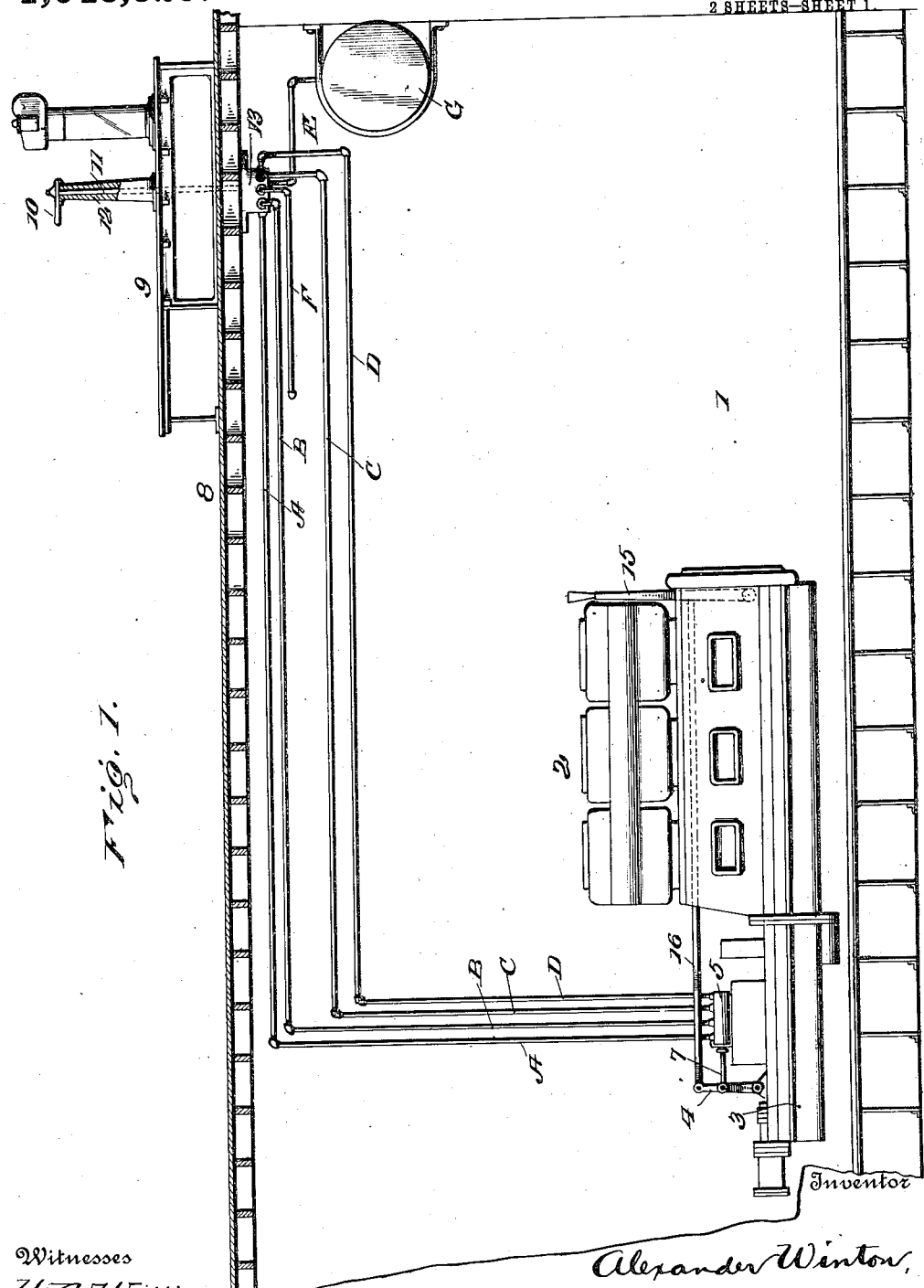
Witnesses
U. A. Williams
C. P. Wright Jr.
Inventor
Alexander Winton,
By A. S. Pattison,
Attorney

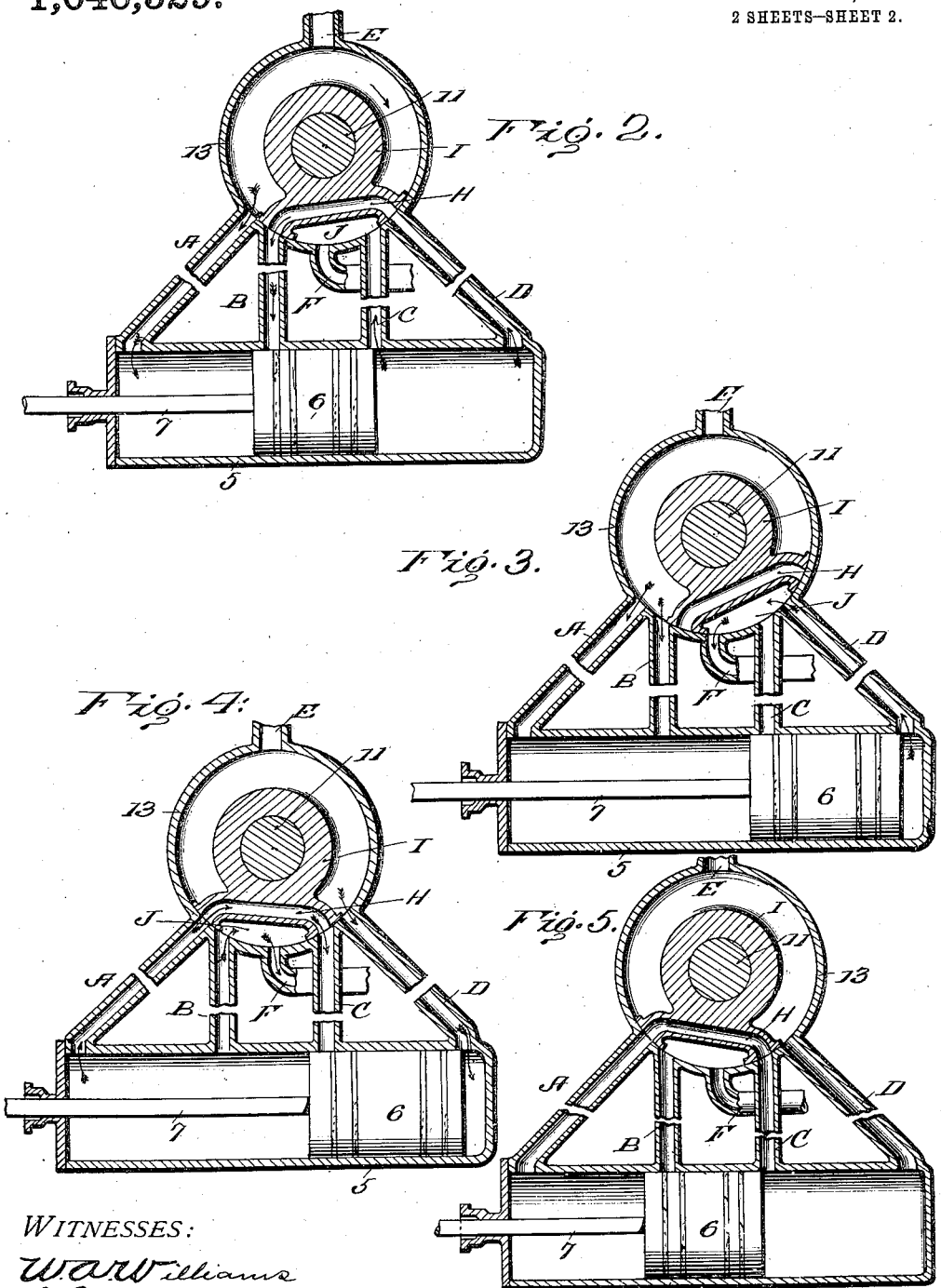

UNITED STATES PATENT OFFICE.

ALEXANDER WINTON, OF CLEVELAND, OHIO.

MECHANISM FOR CONTROLLING THE POSITION OF THE DIRECTION-LEVER OF A MOTOR-DRIVEN VESSEL.

1,046,529. Specification of Letters Patent. Patented Dec. 10, 1912.

Application filed September 30, 1911. Serial No. 652,060.

*To all whom it may concern:*

Be it known that I, ALEXANDER WINTON, a citizen of the United States, residing at Cleveland, in the county of Cuyahoga and State of Ohio, have invented certain new and useful Improvements in Mechanism for Controlling the Position of the Direction-Lever of a Motor-Driven Vessel, of which the following is a specification, reference being had therein to the accompanying drawings.

This invention relates to improvements in mechanism for controlling the position of the direction lever of a motor driven vessel, and is more particularly designed to be used on boats which are propelled by gasolene motors, and in which the motor runs continuously in one direction.

Where the direction of the motor is not changed, it is well-known to those skilled in this art that the direction of the vessel is controlled either by an intervening mechanism or transmission gearing between the engine and the propeller shaft, or by a reversible or changeable blade propeller, and that in both mechanisms there is a lever which has a forward, a neutral and a reverse position.

The object of my present invention is to control the direction lever from a point considerably away from the lever and engine and, preferably, from a point adjacent the steering wheel, whereby the wheelman may have the direction of the vessel immediately under his control, and thereby not dependent upon signals to an engineer or person at the engine, which, in large boats, is so located that the position and movement of the vessel cannot be determined by him.

In the accompanying drawings—Figure 1 is a sectional view of a portion of the interior of a motor driven vessel, showing therein a side elevation my improvement applied thereto. Fig. 2 is a diagrammatic sectional view, showing the position of the lever controlling mechanism when the lever is in a neutral position. Fig. 3 is a similar view showing the position of the lever control-
ling mechanism when the lever is in its forward position. Fig. 4 is a similar view showing the lever controlling mechanism in the position to return the lever to neutral position. Fig. 5 is a similar view showing the position of the lever controlling mechanism when the lever is in its neutral or reverse position.

In Fig. 1 is shown the engine room 1, in which 2 is the engine, 3 a box or casing containing a transmission mechanism (not shown) and 4 a lever adapted to control the transmission mechanism. It is well-known to those skilled in this art that a transmission mechanism for motor boats is so arranged that when in neutral position the engine is disconnected from the propeller shaft; when in a forward position the engine is connected with the propeller shaft and rotates it in a direction to move the boat forward, and when in a backward or reverse position, the engine is connected with the propeller-shaft to carry the boat backward, and as this forms no part of my present invention it is not here shown, and is not necessary to an understanding of the present improvement. Located adjacent the direction lever 4 is a cylinder 5, in which is located a piston 6, the stem or rod 7 of which is connected with the direction lever 4. The deck 8 of the vessel, as here shown, has located thereon a wheelman's platform 9, from which point the vessel is steered.

My present improvement is to enable the direction lever to be controlled from the wheelman's position or platform 9. This is accomplished by providing a hand-operated lever 10, at a convenient position for the wheelman and to connect this with the mechanism which actuates the direction lever. As here shown this lever 10 is connected with a vertical shaft 11, which passes through a suitable supporting standard 12. Located under this standard and within the vessel cabin hold is a valve casing 13, and located within this valve casing 13 is a valve I, which is adapted to be oscillated in the manner and for the purpose hereinafter described. A plurality of pipes A, B, C and D connecting the valve casing 13 with the cylinder 5, and pipe F, communicates with the valve casing 13 and extends outside of the vessel and may be termed an exhaust or relief pipe. A pressure inlet pipe E has one end connected with the valve casing 13 and its opposite end connected with a supply tank G, or other source of air or liquid pressure. The pressure in this tank G, will be supplied in any suitable manner (not here shown) with air or water pressure and this in turn will pass to the valve casing 13 under the control of the valve I therein. This valve I has a port H, and also a port J, which coöperates with the pipes A, B, C, D and F in a manner hereinafter shown and described to cause the piston 6 and the direction lever 4 to assume either a forward, neutral or reverse position, as desired, through the operation of the hand actuated lever 10, which is operatively connected, as above stated, with the valve I.

When the parts are in the position shown in Fig. 5 the piston 6 is in its central position, and the lever 4, Fig. 1, is in central or neutral position. When it is desired to carry the lever 4 to forward position, the valve I is placed in the position shown in Fig. 3, which permits pressure to cylinder 5 through the pipes A and B, and the exhaust through D, J, and F. The piston is then carried by the pressure to the position shown in Fig. 3, and the lever 4 is carried to forward position. To carry the ports to the backing position, the valve I is first moved to the position shown in Fig. 4, and the pressure flows through pipe D and the exhaust through pipe B, chamber J and pipe F until the piston 6 reaches the central or neutral position shown in Fig. 5. When the piston reaches the position shown in Fig. 5 it cuts off the exhaust through B, chamber J and F, and permits pressure through pipes D, C, H, and A, thus placing pressure upon opposite ends of the piston and thus holding the piston at neutral by reason of the pressure being balanced or equal on both ends of the piston 6. A further movement of the valve I to carry the right end of passage H between the pipes C and F and the opposite and left end of the passage H will be closed by the wall of the valve chamber 13. Pressure is then cut off from A, and it flows through C and D, and the exhaust passes through A, chamber J and pipe F, and the piston 6 is forced to the left end of cylinder 5, which is the backing position. The parts are returned to neutral and forward positions by returning the valve first to the position shown in Fig. 2 and then to the position shown in Fig. 3.

In Fig. 1 a hand lever 15 is located at the front end of the engine 2, and a rod 16 connects this hand lever with the direction lever 4, whereby the direction lever can be operated in the engine room, if for any reason it should be desired to operate the direction lever by hand.

The pressure may be supplied either by an air-compressor operated by the engine, or by pressure taken directly from one or more of the engine-cylinders in the manner set forth in my co-pending application Serial Number 394,895, filed September 27th 1907.

Having thus described the invention, what is claimed and desired to secure by Letters Patent is:

1. In a device of the character described, the combination of a direction lever, a cylinder, a piston therein and operatively connected with said lever, a pressure supply, a valve casing having communication with said supply, pipes establishing communication between the ends of said cylinder and said valve casing, and pipes establishing communication between said casing and opposite sides of the center of said cylinder, and a manually operative valve in said casing controlling the supply through said pipes to said cylinder for the purpose described.

2. In a device of the character described, the combination of a direction lever, a cylinder, a piston in said cylinder and operatively connected with said lever, a pressure supply, a valve casing in communication with said supply, two pipes establishing communication between the ends of said cylinder and said valve casing, two pipes establishing communication between said casing and opposite sides of the center of said cylinder, an exhaust passage for said valve casing, and a manually operative valve in said casing, said valve having a cross port, and a recess port, and a reduced center portion, the ports operating substantially as and for the purpose described.

3. A device of the character described, comprising a direction member, a cylinder, a piston therein connected with said member, a pressure supply having communications with each end of the cylinder and also at opposite sides of the center of the cylinder, a movable valve controlling said pressure supplies to cause balanced pressure on opposite sides of said piston when the piston reaches a substantially central position in said cylinder, said valve also adapted to be moved to position to cause said supply pressure on either end only of said piston for forcing it to either end of said cylinder.

4. A device of the character described, comprising a direction member, a cylinder, a piston therein connected with said member, a pressure supply having a communication with each end of said cylinder and also two communications at points between the ends of said cylinder, the piston being longer than the distance between the last mentioned communications for the purpose described, a movable valve for controlling said communications, the valve having a cut-away portion and a transverse passageway whereby the valve may be placed in positions to cause the pressure to force the piston to either end of the cylinder, or be balanced by said pressure in a substantially central position in said cylinder.

In testimony whereof I hereunto affix my signature in the presence of two witnesses.

ALEXANDER WINTON.

Witnesses:
BYRON B. BROCKWAY,
W. J. WARD.